Figures 2, 4:
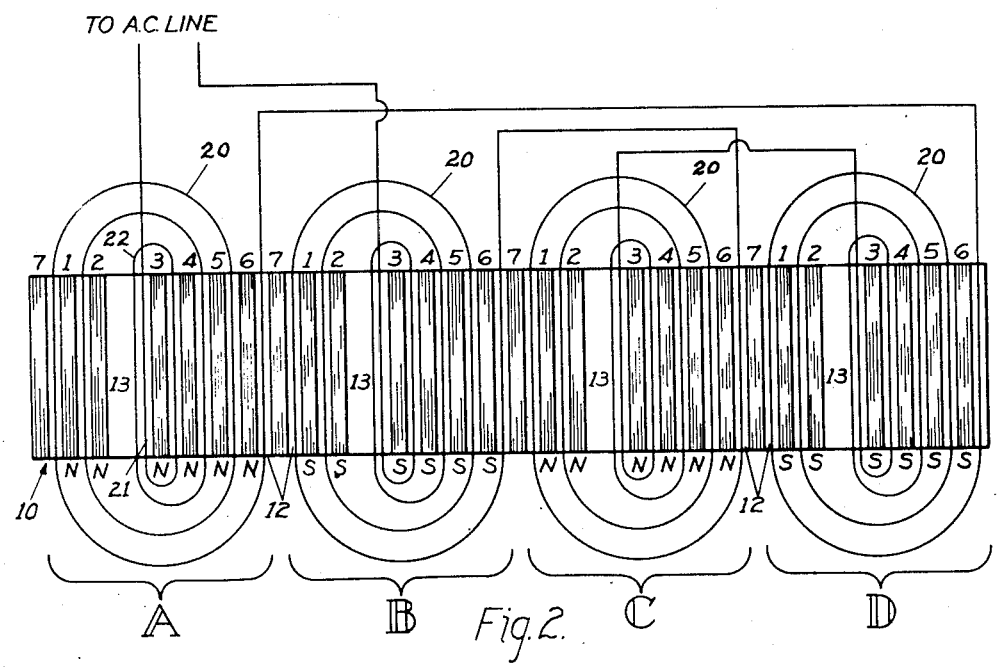

Feb. 28, 1950     E. P. OSWALD     2,498,704
INDUCTION MOTOR
Filed Oct. 9, 1947            2 Sheets-Sheet 1
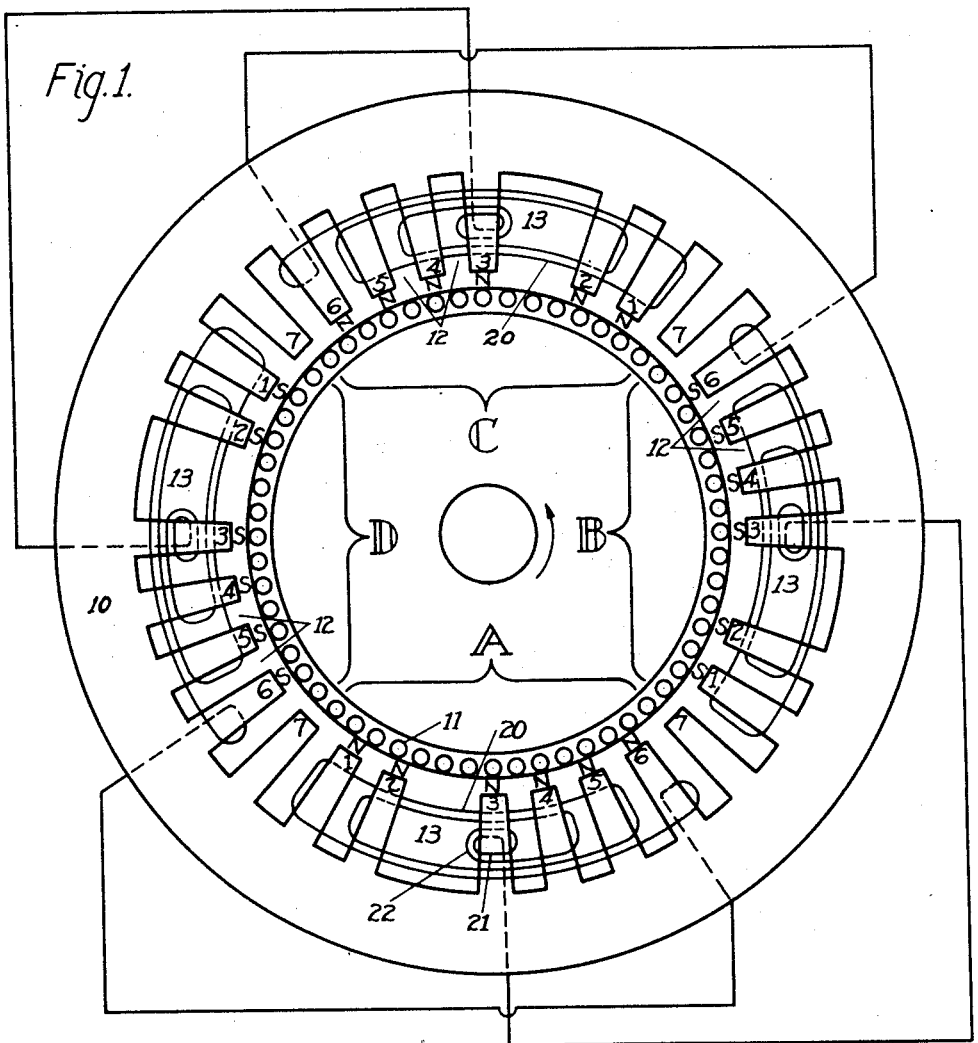
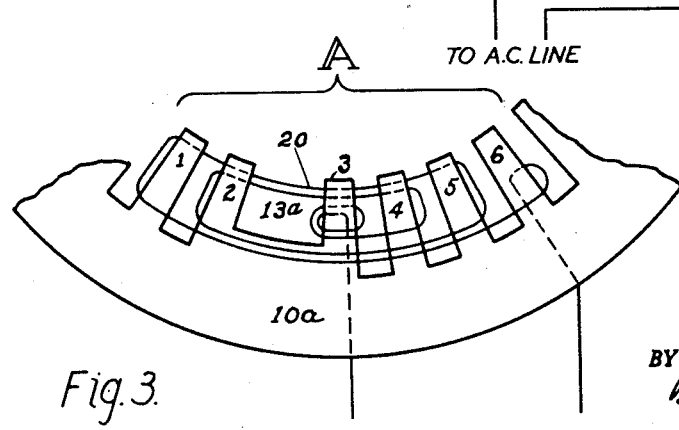
INVENTOR.
EARL P. OSWALD
BY *Bosworth + Sessions*

Feb. 28, 1950     E. P. OSWALD     2,498,704
INDUCTION MOTOR

Filed Oct. 9, 1947     2 Sheets-Sheet 2

INVENTOR.
EARL P. OSWALD
BY
Bosworth + Sessions

Patented Feb. 28, 1950

2,498,704

UNITED STATES PATENT OFFICE 2,498,704

INDUCTION MOTOR

Earl P. Oswald, Oak Park City, Mich.

Application October 9, 1947, Serial No. 778,888

7 Claims. (Cl. 172—275)

This invention relates to induction motors and more particularly to self-starting single phase induction motors. This application is a continuation-in-part of my copending application Serial No. 654,291, filed March 14, 1946, for Electric motor, now abandoned.

Various methods and structures have been devised to provide self-starting single phase induction motors. Prior to the present invention all of the successful motors of this type have required auxiliary windings, switching devices and other devices which have added substantially to the cost of the motors and which have frequently caused the motors to fail because of the delicacy of the auxiliary windings or because of difficulties with the switching devices or the like. Various attempts have been made to devise self-starting single phase induction motors without auxiliary windings or the like. Heretofore, these attempts have not met with success because the motors have either had insufficient starting torque, have not been able to accelerate to normal speeds under load or have not been capable of efficient operation at normal speeds.

A general object of the present invention, therefore, is the provision of a self-starting single phase induction motor having but a single primary or stator winding and having a substantial starting torque and substantially normal running characteristics. A further object is the provision of such a motor in which the speed torque curve is smooth, the torque increasing smoothly until the motor has reached a speed in excess of ⅔ of its normal running speed and then decreasing gradually as the speed increases substantially to synchronous speed. A further object is the provision of such a motor in which substantially normal power and efficiency are obtained at normal running speed with a winding embodying the same number of turns as the conventional running winding of a single phase induction motor of the same rated output.

Further objects and advantages of the invention will be apparent from the following description of a preferred form thereof, reference being made to the accompanying drawings in which Figure 1 diagrammatically illustrates a motor embodying my invention; Figure 2 is a developed view of the winding of the motor of Figure 1; Figure 4 is a speed torque curve of a ¼ horsepower motor embodying my invention, and Figure 3 is a view showing a portion of a slightly modified motor embodying my invention.

It has been known that self-starting characteristics can be given to single phase induction motors by so distributing the primary windings and iron that the stator poles produce asymmetric fields. Heretofore, however, such motors have not been capable of bringing normal loads up to normal operating speeds, the reason being because of the effect of harmonics, the motors tend to operate at speeds substantially less than the normal operating speed of a conventional induction motor having the same number of poles.

I have found that the difficulties encountered in prior types of asymmetrically wound induction motors can be overcome by providing motors in which the asymmetry of windings and the magnetic structure is near the center of the poles of the primary. Thus, I preferably employ a toothed stator as the primary, one of the teeth adjacent the center of each pole having additional turns of wire thereon, and the width of the slot between that tooth and the adjacent tooth in the direction away from the center of the pole face and opposite to the intended direction of rotation of the motor being substantially increased as compared to the preferably uniform width of the other slots. I have produced four pole motors giving excellent results by using a stator of conventional design having, for example, 32 or 36 uniformly spaced teeth and removing one tooth from each pole, the tooth removed being near the center of the pole but removed from the center in a direction opposite the direction of rotation of the rotor, and by disposing those turns of the winding which normally would be disposed in the two slots on opposite sides of the removed tooth in the single large slot created by the removal of the tooth. The windings of the remaining teeth of the pole may be made in the conventional manner. Thus, in motors embodying my invention the asymmetry is near the centers of the respective poles, whereas prior attempts at producing self-starting single phase induction motors with single windings have involved asymmetry in the windings or the iron or both, extending throughout each pole or concentrated at the edges of the poles.

Referring now to the drawings, Figures 1 and 2 illustrate the application of my invention to a single phase induction motor having a stator or primary 10 having four poles indicated at A, B, C and D, alternate poles being of opposite polarity. The rotor 11 is shown in the drawing as being of the squirrel cage type, but it is to be understood that my invention also may be adapted to wound rotor induction motors.

The stator includes 28 teeth separated by slots 12 of normal size, there being one slot 13 of substantially greater width than the slots 12 in each pole face. The stator shown in the drawings is of conventional design for a 32 tooth stator with four equally spaced teeth removed to provide the wide slots 13. The winding is arranged as shown in Figures 1 and 2 so that there are twice as many turns in each wide slot 13 adjacent the tooth numbered 3 in each pole face as there are in any of the other slots. In the drawing, the windings are indicated by the lines 20, each line constituting, for example, 30 turns of wire. Thus, in the embodiment shown there are 60 turns of wire in each wide slot 13, whereas the slots 12 each have 30 turns of wire.

This arrangement of the winding produces a strongly asymmetric air gap flux adjacent each pole. The omission of the tooth to create the wide slot 13, together with the increased number of turns in slot 13, creates a much greater flux density in the teeth numbered 3 in each pole, and this asymmetry in each pole produces the required starting torque. It will be noted that in each pole the turns 21 and 22 which extend through slot 13 and around the teeth numbered 3 and 4 contain twice as many conductors as are disposed in any other slot. This proportion may be varied, but I prefer that the large slot contain from 10% to 30% of the total number of conductors passing through the slots of any one pole. In the example given, there are 60 conductors in the large slot and 30 conductors in each of the other five slots, or a total of 210 conductors in the slots of each pole; thus the large slot contains about 28% of the total number of conductors passing through the slots of the pole; this proportion is preferably reduced in motors having larger numbers of slots per pole.

While the asymmetric arrangement of the primary windings and iron produces ample starting torque, it does not substantially affect the operation of the motor at normal running speed. The reasons for this are not entirely clear, but motors embodying my invention behave as though the primaries produce rotating fields as in polyphase motors; it is thought that perhaps the asymmetry of the winding produces an additional magnetic wave in each pole. In any event, regardless of underlying theories, by disposing search coils around each of the teeth numbered 1 to 6 in a motor having a winding as shown in Figures 1 and 2 and investigating the voltages induced in the search coils with the aid of an oscilloscope, I have found that when the motor is stationary with the rotor locked against rotation, there is a great difference in both the magnitude and form of the voltages induced in the coils around the teeth numbered 3 of the poles, and as compared to the coils around the teeth numbered 1, 2, 4, 5 and 6. There are also substantial differences between the voltages induced in search coils disposed around these latter teeth, but the differences are not as marked as those between tooth 3 and the others. However, when the motor is running at normal speed under load, these differences substantially disappear, and the oscilloscope traces are very similar to those obtained from a conventional single phase induction motor with a symmetrical stator structure and a symmetrical running winding.

Thus, it appears that with my motor there are no harmonic effects great enough seriously to interfere with the operation of the motor and its acceleration to normal speed under load, as shown by the torque curve constituting Figure 3. The curve in Figure 3 is of a ¼ horsepower 4 pole motor; the torque increases in a smooth curve from a little more than 11 foot ounces at zero speed to a maximum of about 28 foot ounces at about 1300 R. P. M., and thereafter gradually falls off to about 11 foot ounces at normal running speed of 1700 R. P. M. and then drops to zero as synchronous speed is approached. Those skilled in the art will recognize the similarity of this curve to torque curves of conventional polyphase motors. It is to be noted that at no point in the curve between zero and normal operating speed does the torque fall below normal full load torque. Thus, the motor is able to bring a normal torque load up to speed rapidly and smoothly.

In Figure 4 of the drawings a slightly modified form of stator 10a is shown. Here the teeth 1, 2, 3, 4, 5, 6 and 7 are arranged as before as are the windings. However, in this form the wide slots 13a of each pole are not as deep as the remaining slots; in effect, the iron removed from the field structure in making these slots wider has been replaced by making them shallower; this has the effect of improving the starting torque.

It will be understood that motors made according to my invention may be of conventional design and construction except for the arrangement of the windings and the stator teeth. I have found that very satisfactory motors can be produced merely by taking a conventional split phase motor, eliminating the starting winding and switch, removing one tooth from each pole as described above, and rewinding the running winding with substantially the same number of turns as before, but with the turns arranged as described above. Thus there are no difficulties involved in the design of my motors, and they may be manufactured more economically than conventional motors, because the single windings of my motors are no more costly than the running windings of conventional motors, and the auxiliary windings, switches and the like of conventional motors are eliminated.

It is to be understood that various changes and modifications may be made in my invention without departing from the spirit and scope thereof. For example, the invention may be adapted to motors having different numbers of poles or different numbers of teeth in the stator; the invention may also be applied to motors in which the primary is the rotor rather than the stator; the windings shown herein are of the concentric, skein wound type whereas other equivalent windings of other types, such as progressive windings, may be employed. Therefore, it is to be understood that my invention is not limited to the preferred forms described herein, or in any manner other than by the appended claims.

I claim:

1. A single phase self-starting induction motor comprising a secondary and a primary, said primary having a plurality of poles, each pole embodying a plurality of projecting teeth providing slots between the teeth, a slot adjacent but offset from the center of each pole having a width between the faces of the teeth substantially greater than the width of the remaining slots in the pole, a single continuous winding for each pole, each such winding including coils disposed about the two teeth adjacent the wider slot on one side thereof, said coils being in series with the remaining windings for the particular pole and the conductors extending through said wider slot constituting from 10% to 30% of the total number of conductors passing through the slots of the particular pole.

2. A single phase self-starting induction motor comprising a secondary and a primary, said primary having a plurality of poles, each pole embodying a plurality of projecting teeth providing slots between the teeth, the teeth in the primary being of the same width and being spaced equally on centers except for the spacing between the center tooth of each pole and one tooth adjacent thereto which teeth, including the faces thereof, are spaced on centers a distance substantially double the spacing of the other teeth, whereby wider slots are provided on one side of each center tooth and narrower slots of uniform width are provided adjacent the other teeth, a winding for each pole, each winding including in series therewith coils disposed in part in said wider slot and extending about the center tooth and the tooth adjacent thereto on the side thereof opposite the wider slot, the number of conductors disposed in said wider slot being substantially twice the number of conductors disposed in the narrower slots.

3. A single phase self-starting induction motor comprising a squirrel cage rotor and a stator, said stator having a plurality of poles, each embodying a plurality of projecting teeth providing slots between the teeth, the slot disposed at one side of the center tooth of each pole face being at least 100% wider from the face of the teeth to the base of the slot than the remaining slots in the pole, a single winding for each pole, each winding including coils disposed about the center tooth and the tooth adjacent thereto on the side thereof opposite the wider slot, one side of both said coils extending through said wider slot.

4. A single phase self-starting induction motor comprising a rotor and a stator, said stator having a plurality of poles each embodying a plurality of projecting teeth providing slots between the teeth, the slots for each pole being of uniform width except for one wider slot disposed near the center of each pole but offset from the center in a direction opposite to the direction of rotation of the rotor, a winding for each pole extending through said slots, the slots of uniform width containing substantially uniform numbers of turns, the wider slot of each pole containing an additional number of turns which extend around teeth in said pole disposed adjacent said wider slot in the direction of rotation of said rotor.

5. A motor according to claim 4 wherein the wider slots each contain substantially twice the number of turns contained in one of the narrower slots.

6. A single phase self-starting induction motor comprising a secondary and a primary, one of which constitutes a rotor and the other a stator, said primary having a magnetic structure providing a pole embodying a plurality of projecting teeth and slots between the teeth, said pole having one slot substantially wider than the remaining slots, said wider slot being disposed near the center of the pole but offset from the center in a direction opposite to the direction of rotation of the rotor, said pole having only a single continuous winding disposed in said slots, the number of turns of said winding disposed in said wider slot being substantially greater than the number of turns disposed in any other slot of the pole, the turns in said wider slot extending around teeth in said pole disposed adjacent said wider slot in the direction of rotation of said rotor.

7. A single phase self-starting induction motor comprising a secondary and a primary, one of which constitutes a rotor and the other a stator, said primary having a magnetic structure providing a pole embodying a plurality of projecting teeth and slots between the teeth, said pole having one slot substantially wider than the remaining slots, said wider slot being disposed near the center of the pole but offset from the center in a direction opposite to the direction of rotation of the rotor, said pole having only a single continuous winding disposed in said slots, the number of turns of said winding disposed in said wider slot being substantially twice the average number of turns disposed in the remaining slots of said pole.

EARL P. OSWALD.

REFERENCES CITED

The following references are of record in the file of this patent:

UNITED STATES PATENTS

| Number | Name | Date |
|---|---|---|
| 2,125,309 | Oswald | Aug. 2, 1938 |

FOREIGN PATENTS

| Number | Country | Date |
|---|---|---|
| 801,985 | France | May 30, 1936 |